United States Patent
Ll et al.

(10) Patent No.: US 9,140,265 B2
(45) Date of Patent: Sep. 22, 2015

(54) BLOWER

(75) Inventors: Yue Ll, Hong Kong (CN); Mao Xiong Jiang, Shenzhen (CN); Jian Zhao, Shenzhen (CN); Zhi Jun Wang, Shenzhen (CN); Ke Yan, Shenzhen (CN); Yong Wang, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 355 days.

(21) Appl. No.: 13/422,659

(22) Filed: Mar. 16, 2012

(65) Prior Publication Data
US 2012/0237373 A1 Sep. 20, 2012

(30) Foreign Application Priority Data

Mar. 17, 2011 (CN) .......................... 2011 1 0068344

(51) Int. Cl.
F04D 25/06 (2006.01)
H02K 9/06 (2006.01)
H02K 1/18 (2006.01)
F04D 29/42 (2006.01)

(52) U.S. Cl.
CPC ........ *F04D 25/0606* (2013.01); *F04D 29/4253* (2013.01); *H02K 1/185* (2013.01); *H02K 9/06* (2013.01)

(58) Field of Classification Search
CPC ........... H02K 7/14; H02K 9/06; H02K 1/185; F04D 29/444; F04D 29/542; F04D 13/06
USPC ........................................... 417/423.7, 410.1
See application file for complete search history.

(56) References Cited

U.S. PATENT DOCUMENTS

| | | | | |
|---|---|---|---|---|
| 4,041,340 A | * | 8/1977 | Mrcun | 310/263 |
| 4,563,606 A | * | 1/1986 | Fukasawa et al. | 310/208 |
| 4,767,285 A | * | 8/1988 | Jyoraku et al. | 417/366 |
| 5,191,698 A | * | 3/1993 | Sumi et al. | 29/596 |
| 6,703,754 B1 | * | 3/2004 | Finkenbinder et al. | 310/227 |
| 7,163,372 B2 | * | 1/2007 | Kegg | 415/208.2 |
| 7,223,070 B2 | * | 5/2007 | Tam et al. | 415/208.3 |
| 7,638,919 B2 | * | 12/2009 | Pulnikov et al. | 310/257 |
| 7,965,012 B2 | | 6/2011 | Murakami et al. | |
| 2003/0147746 A1 | * | 8/2003 | Poon et al. | 415/208.2 |
| 2006/0239838 A1 | * | 10/2006 | Rahbar et al. | 417/354 |
| 2006/0284509 A1 | * | 12/2006 | Han et al. | 310/156.81 |
| 2008/0014080 A1 | * | 1/2008 | Fang | 415/191 |

FOREIGN PATENT DOCUMENTS

| | | |
|---|---|---|
| CN | 101783534 A | 7/2010 |
| JP | 59129546 A | 7/1984 |
| JP | 1138937 A | 5/1989 |

* cited by examiner

*Primary Examiner* — Charles Freay
*Assistant Examiner* — Lilya Perkarskaya
(74) *Attorney, Agent, or Firm* — Muncy, Geissler, Olds & Lowe, P.C.

(57) ABSTRACT

A blower includes an air pump and a motor. The pump includes an impeller and a casing housing the impeller. The casing includes a casing inlet through which air is drawn in and a casing outlet through which the air is expelled by the impeller. The motor is arranged at the casing outlet and includes a stator and a rotor. The stator includes a stator core and a plurality of coils. The stator core includes a substantially ring-shaped yoke and a plurality of teeth extending inwards from the yoke. Each coil is wound around the yoke and is partially sandwiched between two adjacent teeth. The impeller is driven by the rotor.

12 Claims, 5 Drawing Sheets

BLOWER

CROSS REFERENCE TO RELATED APPLICATIONS

This non-provisional patent application claims priority under 35 U.S.C. §119(a) from Patent Application No. 201110068344.2 filed in The People's Republic of China on Mar. 17, 2011.

FIELD OF THE INVENTION

This invention relates to blowers and, in particular, to a blower having high heat radiation efficiency.

BACKGROUND OF THE INVENTION

Blowers employed in a hand dryer or a vacuum cleaner have a motor and a fan or air pump driven by the motor. The motor includes a stator, a rotor, and a shell housing the stator and the rotor. The stator includes a yoke, a number of teeth extending inwardly from the yoke, and a number of coils winding around the teeth. As the coils are received in the slots between the teeth, the surface of each coil that is exposed to the air is small. As such, heat generated by the coils can not dissipate efficiently. Furthermore, the shell hinders the radiation of the heat.

SUMMARY OF THE INVENTION

The present invention aims to provide a new blower which can solve the above mentioned problems.

Accordingly, in one aspect thereof, the present invention provides a blower comprising: an air pump, wherein the pump comprises an impeller and a casing housing the impeller, the casing comprises a casing inlet through which air is drawn into the casing by the impeller and a casing outlet through which air is expelled by the impeller; and a motor arranged to drive the impeller, the motor being disposed at the casing outlet and comprising a stator and a rotor, the stator comprising a stator core and a plurality of coils, wherein the stator core comprises a substantially ring-shaped yoke and a plurality of teeth extending inwardly from the yoke, each coil being wound around the yoke and partially sandwiched between two adjacent teeth.

Preferably, the motor is substantially coaxial with the casing outlet, the outer diameter of the stator is equal to or less than the inner diameter of the casing outlet.

Preferably, a bearing bracket extends across the casing outlet, and a first bearing is fixed to the bearing bracket for rotatably supporting the rotor.

Preferably, the pump further comprises a diffuser received in the casing for guiding air flow generated by the impeller to the casing outlet.

Preferably, the impeller is a centrifugal impeller and comprises an impeller inlet that communicates with the casing inlet and a plurality of impeller outlets that are substantially perpendicular to the impeller inlet and communicate with the diffuser.

Preferably, the diffuser comprises a circular plate, a plurality of diffuser vanes extending from a first side of the circular plate, and a plurality of guide vanes extending from a second side of the circular plate; the diffuser vanes being arranged on an outer edge of the circular plate and surrounding the impeller outlets, the guide vanes extending from the outer edge of the circular plate towards the center of the circular plate.

Preferably, a motor bracket is provided, wherein the motor bracket comprises an end portion and a plurality of arms that extend from the end portion to the casing and are connected to the casing, the stator core is connected to the motor bracket and the motor is surrounded by the motor bracket.

Preferably, the stator comprises a plurality of connecting bars connected to the outer surface of the yoke, each connecting bar being fixed to a corresponding arm.

Preferably, the end portion is cross-shaped and four arms perpendicularly extend from the four ends of the end portion, the stator core being connected to the arms.

Preferably, a second bearing is fixed to the end portion of the motor bracket for rotatably supporting the rotor.

Preferably, the stator core is made up of at least two arcuate parts.

Preferably, the rotor is an inner permanent magnet rotor and the rotor is received in the stator.

In embodiments of the present invention, the coils are wound around the yoke, so that the parts of the coil that cover the inner and outer surfaces of the yoke are exposed to the air. As such, heat dissipates efficiently.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
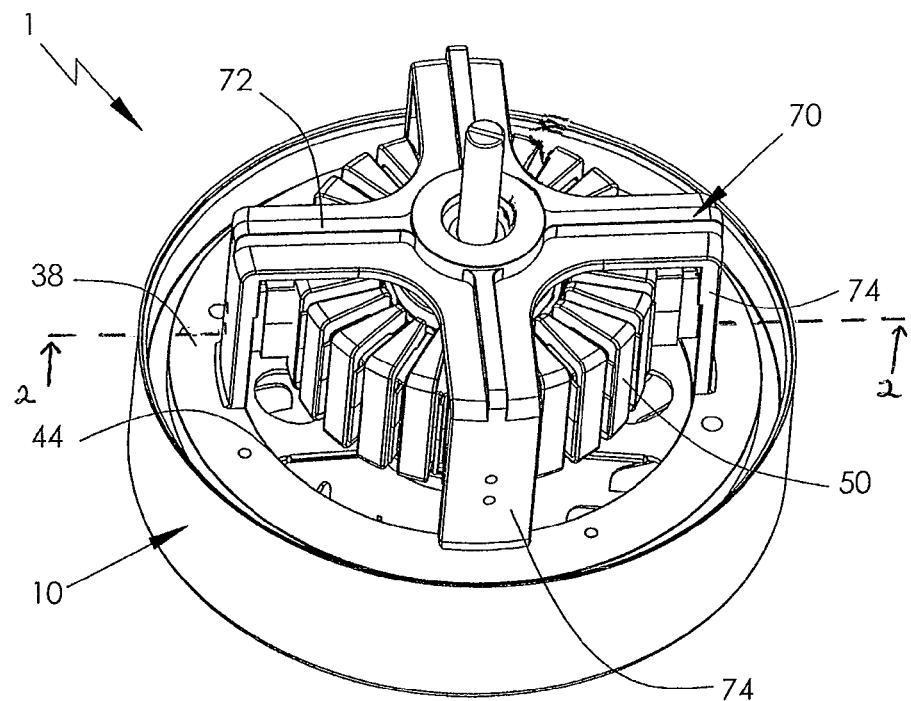
FIG. 1 illustrates a blower, according to the present invention.

A blower according to the present invention can be used in a hand dryer, a vacuum cleaner, or like devices. As shown in the figures, the blower 1 includes a fan or air pump 10, a motor bracket 70 fixed to the pump 10, and a motor 50 fixed to the motor bracket 70 for driving the pump 10.

The pump 10 includes an impeller 12, a diffuser 24 partially surrounding the impeller 12, and a casing 32 housing the impeller 12 and the diffuser 24.

The impeller 12 is a centrifugal impeller and includes a first plate 14, a second plate 16, and a number of blades 18 fixed between the first and second plates 14, 16. The impeller 12 defines an impeller inlet 20 in the center of the first plate 14 and a number of impeller outlets 22, defined by the first plate 14, the second plate 16, and two adjacent blades 18. The impeller outlets 22 are perpendicular to the impeller inlet 20.

The diffuser 24 includes a circular plate 26, a number of arcuate diffuser vanes 28 extending from a side of the circular plate 26, and a number of guide vanes 30 extending from the other side of the circular plate 26. The diffuser vanes 28 are arranged on the edge of the circular plate 26 so as to define a receiving space between inner ends thereof for receiving the impeller 12, with the impeller inlet 20 facing away from the circular plate 26. The guide vanes 30 curvedly extend from the edge of the circular plate 26 towards the center of the circular plate 26.

The casing 32 is substantially cup-shaped and includes a substantially circular end plate 34, a tubular side wall 36, a substantially ring-shaped covering plate 38, and a bearing bracket 40. The end plate 34 has a casing inlet 42 that axially communicates with the impeller inlet 20. The side wall 36 perpendicularly extending from the outer edge of the end plate 34, surrounding and facing the impeller outlets 22. The covering plate 38 is assembled to the side wall 36, facing the circular plate 26 of the diffuser 24. The covering plate 38 defines a casing outlet 44 such that the inner ends of the guide vanes 30 of the diffuser 24 are exposed therein. Opposite ends of the bearing bracket 40 are connected to the radially inner edge of the covering plate 38, built over the casing outlet 44. Preferably, the bearing bracket is formed as an integral part of the covering plate 38. The bearing bracket 40 has a first shaft hole 46 on the center thereof for supporting a first bearing 82 for the motor shaft.

Figure 9:
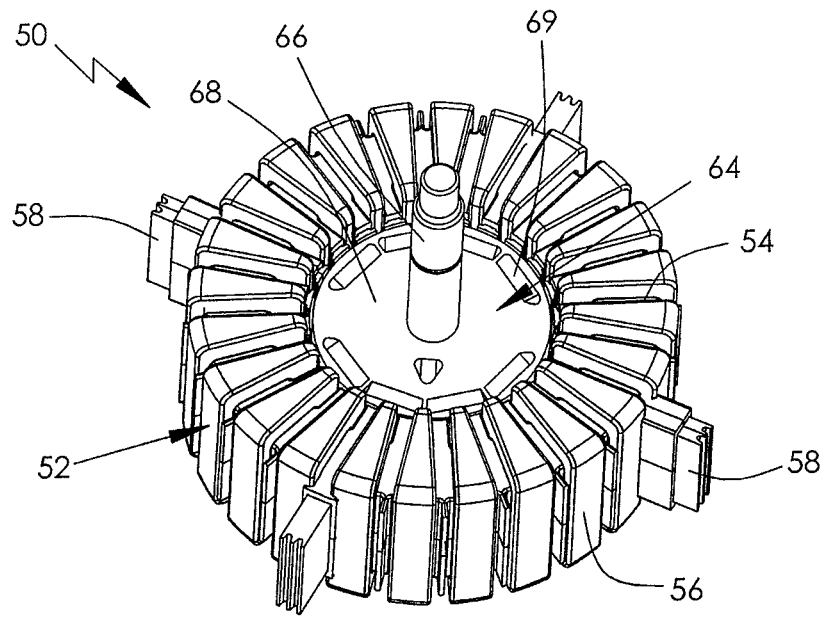
FIG. 9 shows a motor of the blower of FIG. 1.
Figure 10:
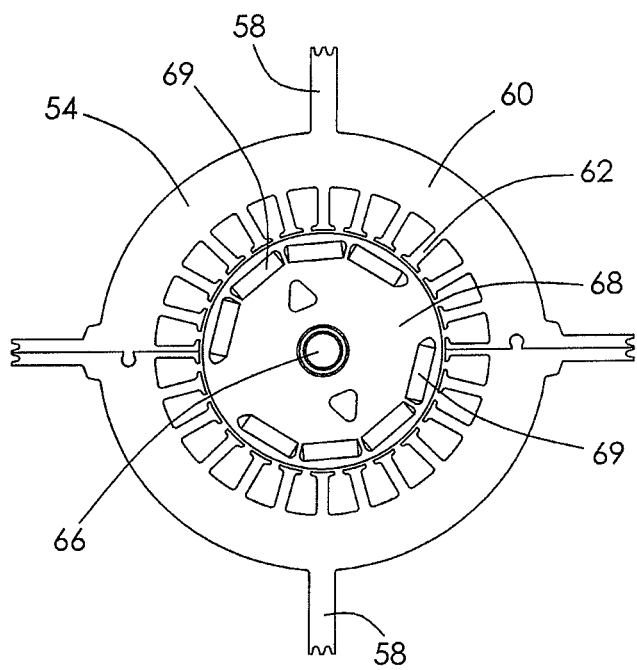
FIG. 10. is a plan view of the motor of FIG. 9 without coils.

Referring to FIGS. 9 and 10, the motor 50 includes a stator 52 and a rotor 64 received in the stator 52. The outer diameter of the stator 52 is preferably less than or equal to the diameter of the casing outlet 44. The stator 52 includes a stator core 54, a number of coils 56, and four connecting bars 58 preferably formed as part of the stator core. The stator core 54 includes a substantially ring-shaped yoke 60 and a number of teeth 62 extending inwardly from the inner surface of the yoke 60. The connecting bars 58 connect to the outer surface of the yoke 60 and arranged at regular angular intervals. Each coil 56 is wound around the yoke 60, with the part of the coil 56 that covers the inner surface of the yoke 60 sandwiched between two adjacent teeth 62. Preferably, the stator core 54 is made up of two semi-ring-shaped parts that are assembled together after the coils 56 have been wound to ease the winding process. It should be understood that the stator core 54 can be made up of more than two arcuate parts to achieve the easy winding function.

Figure 2:
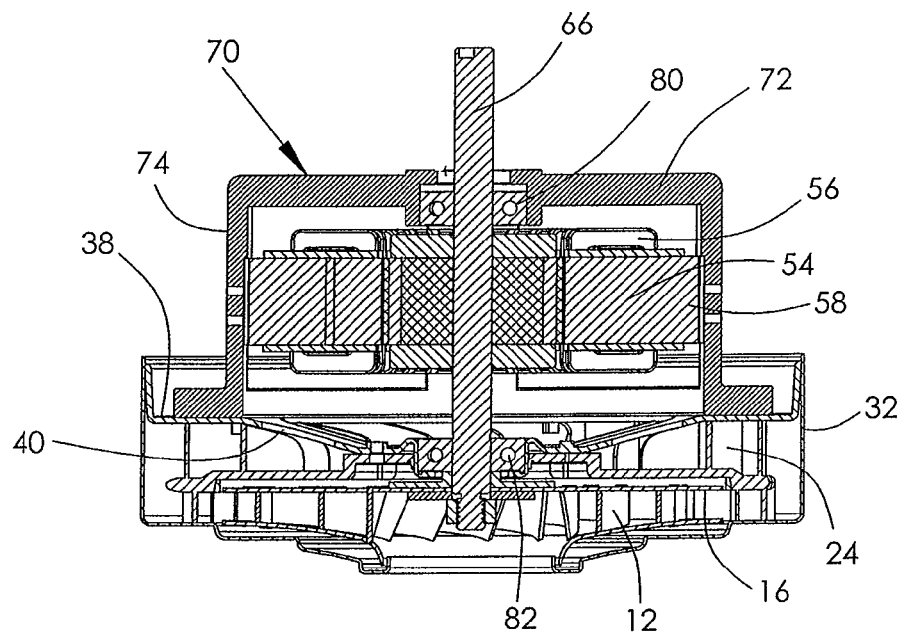
FIG. 2 is a sectional view of the blower of FIG. 1.
Figure 3:
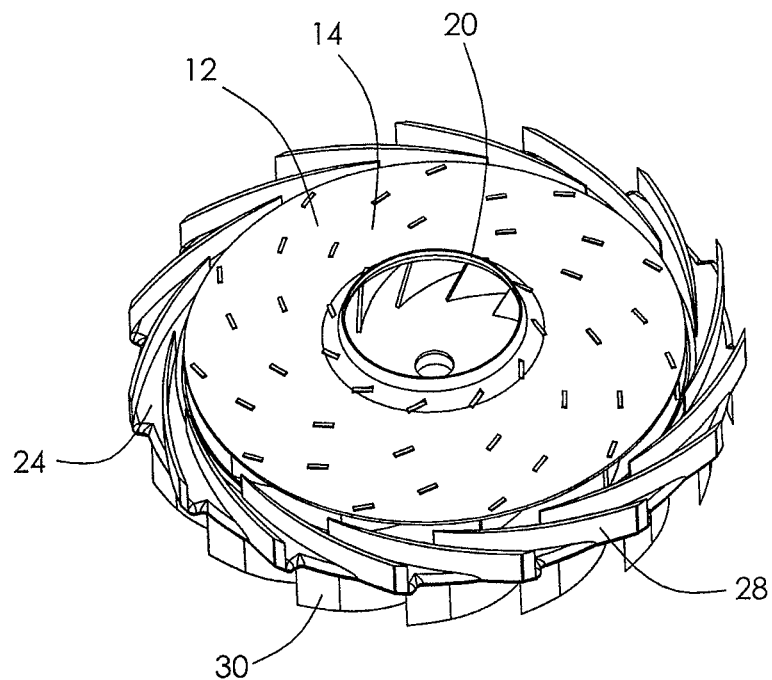
FIG. 3 shows an impeller and a diffuser, being parts of the pump of FIG. 1.
Figure 4:
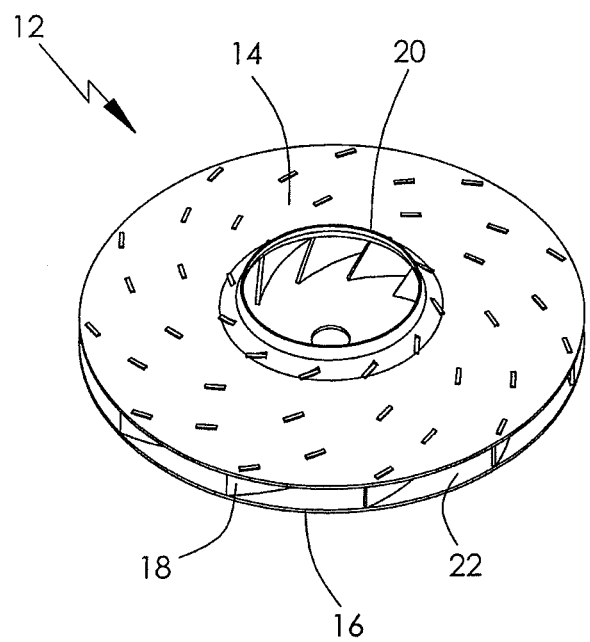
FIG. 4 shows the impeller of FIG. 3.
Figure 5:
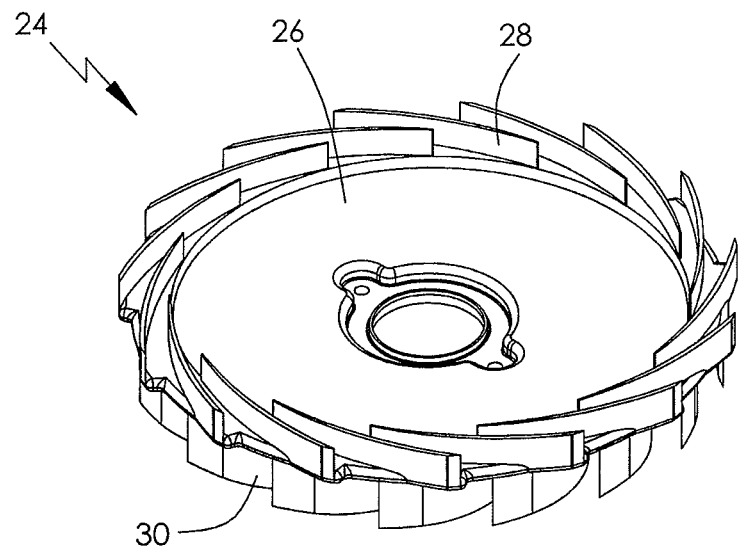
FIG. 5 shows the diffuser of FIG. 3.
Figure 6:
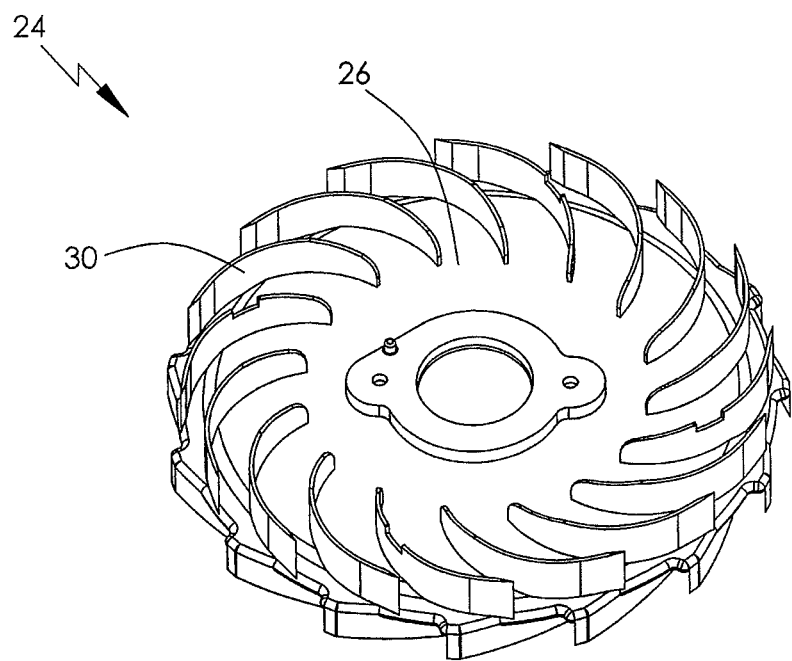
FIG. 6 shows the diffuser of FIG. 5, viewed from below.
Figure 7:
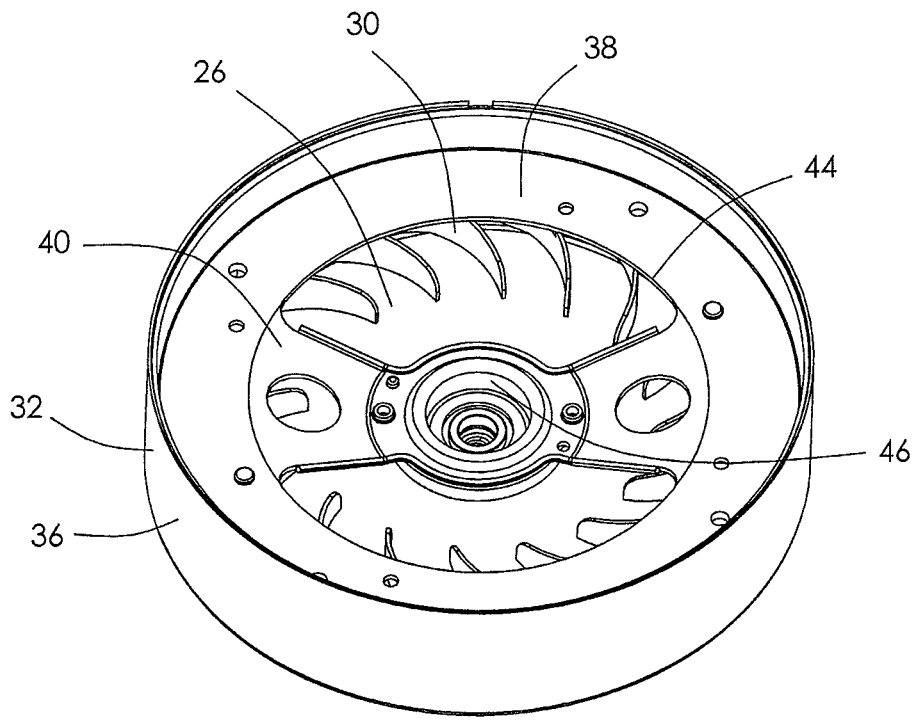
FIG. 7 shows the casing and the diffuser of the blower of FIG. 1.
Figure 8:
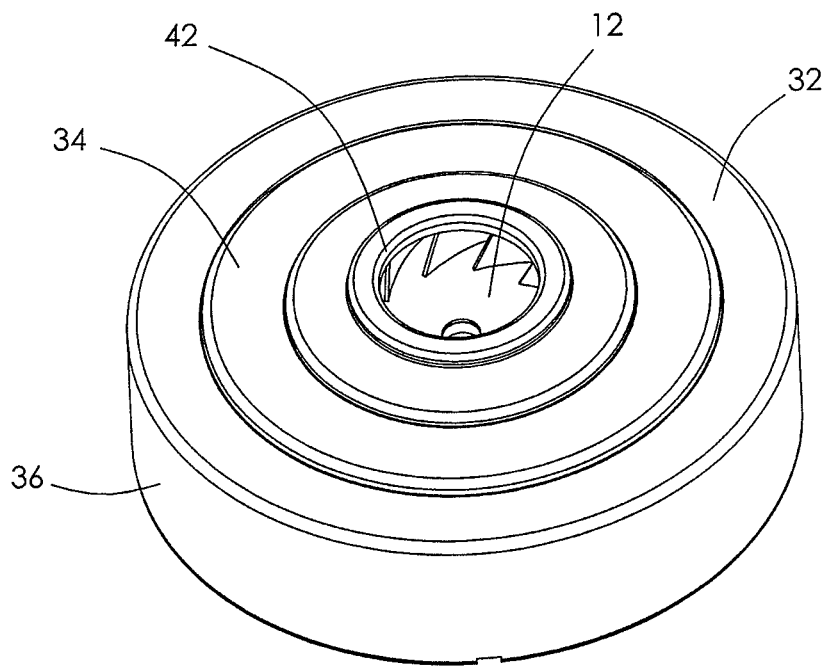
FIG. 8 shows the casing and the impeller of the blower of FIG. 1.

The preferred rotor 64, as shown, is an inner permanent magnet rotor. The rotor has a shaft 66, a rotor core 68 fixed to the shaft 66, and a number of magnets 69 housed inside the rotor core 68. However, it should be understood that the magnets 69 can also be fixed to the outer surface of the rotor core 68. A first end of the shaft 66 is fixed to the impeller and is rotatably supported by the bearing bracket 40 via the first bearing 82 (see FIG. 2).

Referring back to FIGS. 1 and 2, the motor bracket 70 includes a cross-shaped end portion 72 and four arms 74 that perpendicularly extend from the four ends of the end portion 72 and are distant from each other. The motor bracket 70 rotatably supports the second end of the shaft via a second bearing 80 fixed to the end portion 72. The four arms 74 are fixed to the covering plate 38, while the connecting bars 58 are respectively connected to the four arms 74.

In operation, the impeller 12 is driven by rotor 64 of the motor 50 so that air is sucked into the casing 32 by the impeller 12 via the casing inlet 42 and into the impeller inlet 20 and is then thrown out of the impeller outlet 22. Guided by the diffuser vanes 28, the air flow hits the side wall 36 of the casing 32 and is then reflected to casing outlet 44 under the guidance of the guide vanes 30. As the coils 56 are wound around the yoke 60 and the outer diameter of the stator core 54 is less than or equal to the diameter of the casing outlet 44, the coils 56 are sufficiently exposed to the air flow, this means that the air flow can directly blow on to the parts of the coil 56 that are wound on the inner and outer surfaces of the yoke 60. Meanwhile, the air flow can conveniently flow through the big gap between adjacent arms 74 of the motor bracket, which further increases the heat dissipation.

It should be understood that the motor bracket 70 can be connected to the side wall 36 of the casing 32. In this case, the covering plate 38 can be omitted and the bearing bracket 40 can be connected to the side wall 36 of the casing 32. It should be understood that without the diffuser 24, the air can also be pushed out from the casing outlet 44. Also, it should be understood that the number of the arms 74 is not limited to four as long as the stator 52 can be fixed to the motor bracket 70. For example, in other embodiments, there may be three arms. In this case, the configuration of the end portion 72 may change accordingly and the number of the connecting bars 58 changed to three.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A blower comprising: an air pump, wherein the pump comprises an impeller and a casing housing the impeller, the casing comprises a casing inlet through which air is drawn into the casing by the impeller and a casing outlet through which air is expelled by the impeller;

a motor arranged to drive the impeller, the motor being disposed at the casing outlet and comprising a stator and a rotor, the stator comprising a stator core and a plurality of coils, wherein the stator core comprises a substantially ring-shaped yoke and a plurality of teeth extending inwardly from the yoke, each coil being wound around the yoke and partially sandwiched between two adjacent teeth; and a motor bracket configured for rotatably supporting an end of the rotor, the motor bracket comprising an end portion and a plurality of arms extending from the end portion to the casing, the arms being arranged and spaced from each other in a circumferential direction of the blower, an opening being formed between every two adjacent arms, the end portion and the casing, wherein each coil comprises an inner part covering an inner surface of the yoke, an outer part covering an outer surface of the yoke and opposite axial ends respectively covering opposite axial end surfaces of the yoke, the outer parts and axial ends of some of the coils being exposed to outside of the motor bracket via the openings, and wherein the casing is cup-shaped and comprises an end plate at which the casing inlet is formed, a tubular side wall and a ring-shaped covering plate at which the casing outlet is formed, the impeller being axially disposed between the end plate and the covering plate, wherein the stator comprises a plurality of connecting bars connected to the outer surface of the yoke, each connecting bar being fixed to a corresponding arm.

2. The blower of claim 1, wherein the motor is substantially coaxial with the casing outlet, the outer diameter of the stator is equal to or less than the inner diameter of the casing outlet.

3. The blower of claim 1, wherein a bearing bracket extends across the casing outlet, and a first bearing is fixed to the bearing bracket for rotatably supporting the rotor.

4. The blower of claim 1, wherein the pump further comprises a diffuser received in the casing and arranged between the end plate and the covering plate for guiding air flow generated by the impeller to the casing outlet.

5. The blower of claim 4, wherein the impeller is a centrifugal impeller and comprises an impeller inlet that communicates with the casing inlet and a plurality of impeller outlets that are substantially perpendicular to the impeller inlet and communicate with the diffuser.

6. The blower of claim 5, wherein the diffuser comprises a circular plate, a plurality of diffuser vanes extending from a first side of the circular plate, and a plurality of guide vanes extending from a second side of the circular plate; the diffuser vanes being arranged on an outer edge of the circular plate and surrounding the impeller outlets, the guide vanes extending from the outer edge of the circular plate towards the center of the circular plate.

7. The blower of claim 1, wherein the motor is surrounded by the motor bracket.

8. The blower of claim 1, wherein the end portion is cross-shaped and four arms perpendicularly extend from the four ends of the end portion.

9. The blower of claim 7, wherein a second bearing is fixed to the end portion of the motor bracket for rotatably supporting the rotor.

10. The blower of claim 1, wherein the stator core is made up of at least two arcuate parts.

11. The blower of claim 1, wherein the rotor is an inner permanent magnet rotor, the rotor being received in the stator.

12. The blower of claim 1, wherein ends of the arms of the motor bracket away from the end portion are distant from each other and fixed to the covering plate.

* * * * *